United States Patent
Xie (10) Patent No.: US 12,437,785 B2
(45) Date of Patent: Oct. 7, 2025

(54) VIDEO PLAYBACK METHOD AND APPARATUS, AND ELECTRONIC DEVICE

(71) Applicant: VIVO MOBILE COMMUNICATION CO., LTD., Guangdong (CN)

(72) Inventor: Jinyang Xie, Zhejiang (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/411,383

(22) Filed: Jan. 12, 2024

(65) Prior Publication Data

US 2024/0153538 A1    May 9, 2024

Related U.S. Application Data

(63) Continuation of application No. PCT/CN2022/105517, filed on Jul. 13, 2022.

(30) Foreign Application Priority Data

Jul. 15, 2021 (CN) .......................... 202110803088.0

(51) Int. Cl.
| | |
|---|---|
| *G11B 27/00* | (2006.01) |
| *G11B 27/10* | (2006.01) |
| *H04N 5/00* | (2011.01) |
| *H04N 7/01* | (2006.01) |
| *H04N 5/04* | (2006.01) |
| *H04N 7/18* | (2006.01) |

(52) U.S. Cl.
CPC ........... *G11B 27/10* (2013.01); *H04N 7/0127* (2013.01)

(58) Field of Classification Search
CPC . G11B 27/10; H04N 5/00; H04N 5/04; H04N 7/18; H04N 23/00; H04N 7/01
USPC ................ 386/200, 216, 224, 235, 239, 248
See application file for complete search history.

(56) References Cited

U.S. PATENT DOCUMENTS

| | | | |
|---|---|---|---|
| 5,903,313 A | 5/1999 | Tucker et al. | |
| 10,354,394 B2 * | 7/2019 | Choudhury | ........ H04N 21/2353 |
| 2002/0172284 A1 | 11/2002 | Peng et al. | |

(Continued)

FOREIGN PATENT DOCUMENTS

| | | |
|---|---|---|
| CN | 101860755 A | 10/2010 |
| CN | 108810549 A | 11/2018 |

(Continued)

OTHER PUBLICATIONS

Wang, Jin, Research on Rate Control Frame Skipping/Insertion Algorithm for H.264 at Low Bitrate, Chinese Excellent Master's Thesis Full Text Database Information Technology Edition, 2012, Issue 4.

*Primary Examiner* — Daquan Zhao
(74) *Attorney, Agent, or Firm* — The Webb Law Firm (57) ABSTRACT

A video playback method includes obtaining video frame data of a target video and displacement data of a target object in video frames; in a case that the displacement data indicates that a displacement between the target object in a first video frame and the target object in a second video frame of the target video is greater than or equal to a preset value, decoding the video frame data to obtain the first video frame and the second video frame, and inserting a third video frame according to a preset rule; and playing the first video frame, the second video frame, and the third video frame.

16 Claims, 6 Drawing Sheets

(56) References Cited

U.S. PATENT DOCUMENTS

| | | | |
|---|---|---|---|
| 2004/0247029 A1* | 12/2004 | Zhong | H04N 19/56 |
| | | | 375/E7.113 |
| 2008/0101463 A1 | 5/2008 | Lee | |
| 2009/0296819 A1 | 12/2009 | Oshikiri et al. | |
| 2010/0027663 A1 | 2/2010 | Dai et al. | |
| 2011/0310956 A1 | 12/2011 | Lin et al. | |
| 2017/0064325 A1 | 3/2017 | Lim et al. | |
| 2021/0366133 A1 | 11/2021 | Shao et al. | |

FOREIGN PATENT DOCUMENTS

| | | |
|---|---|---|
| CN | 109672886 A | 4/2019 |
| CN | 110399842 A | 11/2019 |
| CN | 110996170 A | 4/2020 |
| CN | 111698500 A | 9/2020 |
| CN | 112055254 A | 12/2020 |
| CN | 113691756 A | 11/2021 |
| JP | 2008035281 A | 2/2008 |
| JP | 200971842 A | 4/2009 |
| KR | 1020170027509 A | 3/2017 |

\* cited by examiner

FIG. 9

VIDEO PLAYBACK METHOD AND APPARATUS, AND ELECTRONIC DEVICE

CROSS-REFERENCE TO RELATED APPLICATIONS

This application is a Bypass Continuation Application of International Patent Application No. PCT/CN2022/105517, filed Jul. 13, 2022, and claims priority to Chinese Patent Application No. 202110803088.0, filed Jul. 15, 2021, the disclosures of which are hereby incorporated by reference in their entireties.

BACKGROUND OF THE INVENTION

Field of the Invention

This application relates to the field of communication technologies, and in particular, to a video playback method and apparatus, and an electronic device.

Description of Related Art

With the development of communication technologies, video playback has become an important function of electronic devices.

Typically, videos are processed by a central processing unit (CPU) of an electronic device. Specifically, after a user selects a to-be-played video, the CPU obtains the to-be-played video according to an operation by the user, decodes the to-be-played video to obtain video frames, and then sends the video frames to a discrete graphics chip, so as to display the video frames.

However, since the to-be-played video includes a plurality of video frames, if the CPU repeats the foregoing operations, it will result in high power consumption of the CPU, thus reducing system performance of the device.

SUMMARY OF THE INVENTION

Embodiments of the present application provide a video playback method and apparatus, and an electronic device.

According to a first aspect, the embodiments of this application provide a video playback method. The method includes: obtaining video frame data of a target video and displacement data of a target object in video frames; in a case that the displacement data indicates that a displacement between the target object in a first video frame and the target object in a second video frame of the target video is greater than or equal to a preset value, decoding the video frame data to obtain the first video frame and the second video frame, and inserting a third video frame according to a preset rule; and playing the first video frame, the second video frame, and the third video frame.

According to a second aspect, the embodiments of this application provide a video playback apparatus. The apparatus includes an obtaining module, a first processing module, a second processing module, and a playback module. The obtaining module is configured to obtain video frame data of a target video and displacement data of a target object in video frames. The first processing module is configured to, in a case that the displacement data indicates that a displacement between the target object in a first video frame and the target object in a second video frame of the target video is greater than or equal to a preset value, decode the video frame data to obtain the first video frame and the second video frame. The second processing module is configured to insert a third video frame according to a preset rule. The playback module is configured to play the first video frame, the second video frame, and the third video frame.

According to a third aspect, the embodiments of this application provide an electronic device. The electronic device includes a processor, a memory, and a program or instructions stored in the memory and executable on the processor, where when the program or instructions are executed by the processor, the steps of the method according to the first aspect are implemented.

According to a fourth aspect, the embodiments of this application provide a non-transitory readable storage medium. The non-transitory readable storage medium stores a program or instruction, where when the program or instructions are executed by a processor, the steps of the method according to the first aspect are implemented.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "first", "second", and the like are typically used to distinguish objects of a same type and do not limit the number of the objects. For example, there may be one or more first objects. In addition, "and/or" in the specification and claims represents at least one of connected objects, and the character "/" generally indicates that the contextually associated objects have an "or" relationship.

It should be noted that the icons in the embodiments of this application may be text, symbols, images, and the like for indicating information, and may use controls or other containers as carriers for displaying the information, including but not limited to textual icons, symbolic icons, and image icons.

The embodiments of this application provide a video playback method and apparatus, and an electronic device. Video frame data of a target video and displacement data of a target object in video frames may be obtained first; then, in a case that the displacement data indicates that the displacement between the target object in a first video frame and the target object in a second video frame of the target video is greater than or equal to a preset value, the video frame data is decoded to obtain the first video frame and the second video frame, and a third video frame is inserted according to a preset rule; and subsequently, the first video frame, the second video frame, and the third video frame are played. With such solution, when the displacement between the target object in the first video frame and the target object in the second video frame of the target video is large, only the first video frame and the second video frame need to be decoded, and video frames in which the target object has a small displacement do not need to be decoded. Therefore, a CPU can be temporarily released from a video processing task, which reduces power consumption of the CPU and improves system performance of the device. In addition, inserting the third video frame can compensate for loss caused by not decoding the video frames in which the target object has a small displacement, thereby ensuring the playback quality of the video.

The following describes in detail the video playback method and apparatus and the electronic device provided in the embodiments of this application by using some embodiments and application scenarios thereof with reference to the accompanying drawings.

Figure 1:
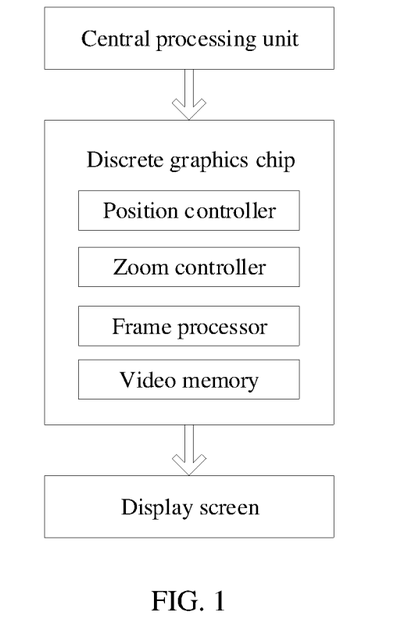
FIG. 1 is a schematic architecture diagram of an electronic device according to embodiments of this application.

FIG. 1 is a schematic architecture diagram of an electronic device according to the embodiments of this application. The electronic device includes a CPU, a discrete graphics chip, a display, and the like.

In the embodiments of this application, the CPU not only has conventional functions such as video recording, video playback, video chatting, Bluetooth pairing, call making, and alarm clock setting, but also can be configured to obtain video frame data and displacement data, decode the video frame data, and send the displacement data and video frames obtained after decoding to a discrete graphics chip.

The discrete graphics chip includes a position controller, a zoom controller, a frame processor, a video memory, and the like. The position controller can be configured to control a position of an image; the zoom controller can be configured to control zoom of an image; the frame processor can be configured to perform frame insertion; and the video memory, also known as a frame buffer, can be configured to store rendering data that has been processed by the graphics chip or that is about to be extracted.

Figure 2:
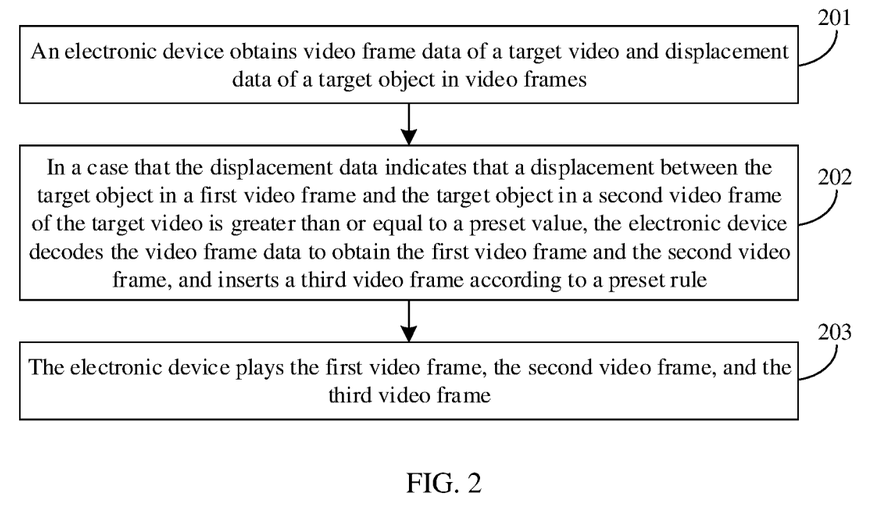
FIG. 2 is a first flowchart of a video playback method according to embodiments of this application.

As shown in FIG. 2, the embodiments of this application provide a video playback method. The video playback method may include the following step 201 to step 203. The following uses an example in which the video playback method is implemented by the electronic device as shown in FIG. 1 for description.

Step 201. The electronic device obtains video frame data of a target video and displacement data of a target object in video frames.

In the embodiments of this application, the video frame data is data obtained after the video frames of the target video are compressed. The displacement data is data obtained after the target object in the video frames of the target video is analyzed. The displacement data can be used for indicating position vectors of the target object in the video frames, for example, positions in the video frames and relative displacement between adjacent video frames.

Optionally, the video frame data and the displacement data may be two independent groups of data and are packed into one group of data. Alternatively, the displacement data may be data included in the video frame data after decoding. This may be determined depending on an actual use requirement and is not limited in the embodiments of this application.

Optionally, the target video may be a video shot by an electronic device, a video shared by other devices and received by the electronic device, a video downloaded by the electronic device from a server, or the like.

Illustratively, the target video being a video shot by a mobile phone is used as an example. After a user has triggered a mobile phone to shoot a target video, the mobile phone can start to record the target video, analyze a position vector (also referred to as a motion vector) of a moving object in each video frame recorded, and then record obtained displacement data into video frame data. In this way, when the user wants to watch the target video, the mobile phone can respond to a user input and play the target video based on the video frame data and the displacement data. A playback mode may refer to description in the following embodiments. Details are not described herein.

Optionally, the target object may be a moving object. The moving object may be a running horse, a flying bird, a falling leaf, a waving arm, a flowing spring, a flashing neon light, or any other movable object. It can be understood that during video shooting of an electronic device, when an object moves, relative positions of this object in video frames change accordingly, to be specific, position vectors of the target object in the video frames change.

Optionally, since the target object is represented by a color in the video frames. Therefore, the displacement data of the target object may be color data of the video frames.

In some embodiments, the color data of the video frames may be pixel values of pixels in the video frames.

Figure 3:
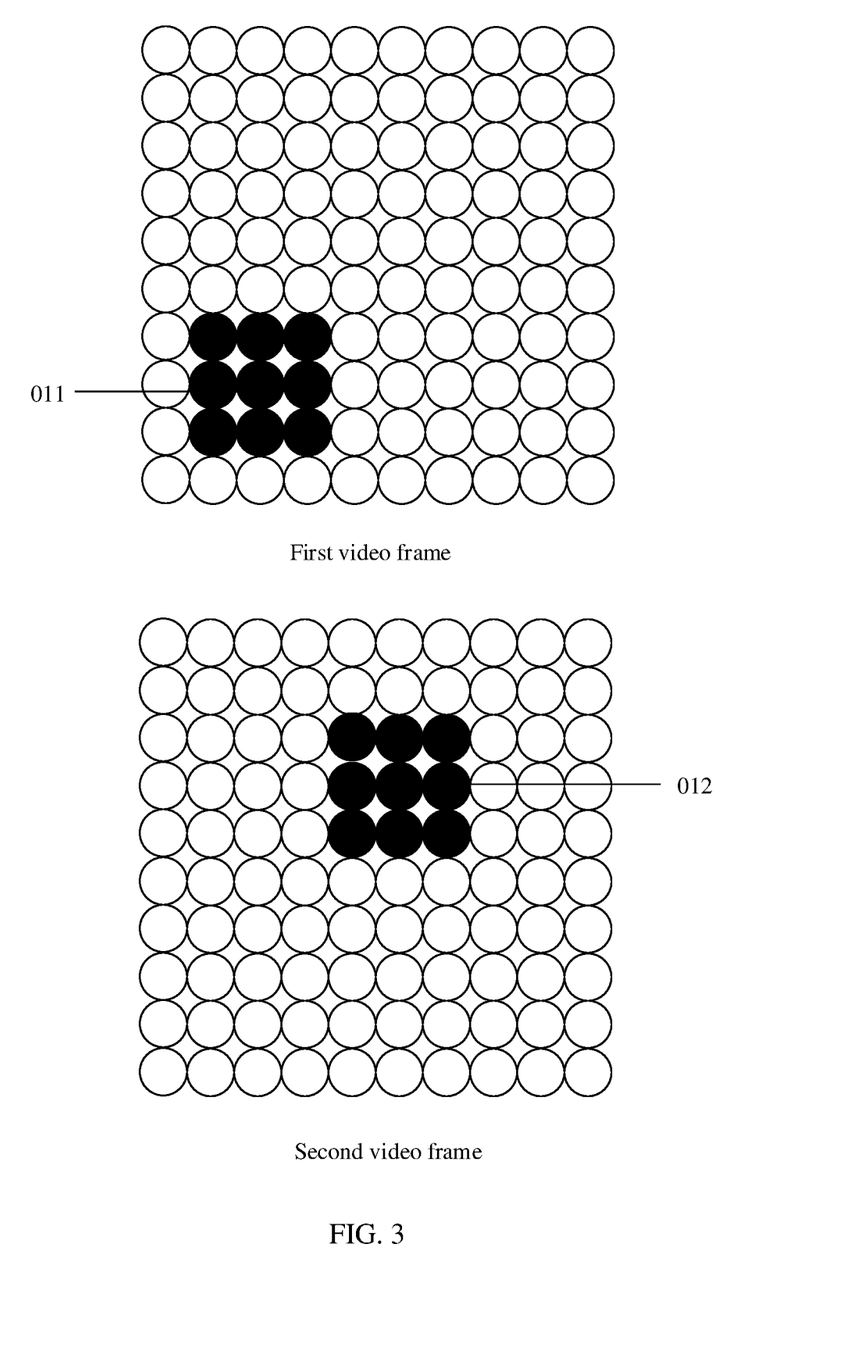
FIG. 3 is a schematic diagram of a target object in two video frames according to embodiments of this application.

Illustratively, as shown in FIG. 3, one circle represents one pixel, and image widths and image heights of a first video frame and a second video frame are both 10 pixels. Coordinates of four vertexes of a region 011 of the first video frame are respectively (2,2), (4,2), (2,4), and (4,4), and pixel values of pixels in the region 011 are all a1. Coordinates of four vertexes of a region 012 of the second video frame are respectively (5,6), (7,6), (5,8), and (7,8), and pixel values of pixels in the region 012 are also all a1. Assuming that the region 011 of the first video frame is a region where the target object is located, since the region 011 of the first video frame and the region 012 of the second video frame have a same size, and the pixels contained in the region 011 of the first video frame and the pixels contained in the region 012 of the second video frame have a same pixel value, it can be determined that as compared with the first video frame, the target object in the second video frame moves to the region 012, to be specific, the target object moves from the region 011 to the region 012.

It should be noted that in the foregoing FIG. 3, an example in which the pixel values of all pixels in the region 011 and the region 012 are a1 is used for description. This does not constitute any limitation on the embodiments of this application. It can be understood that the pixel values of the pixels in the region 011 and the region 012 may be different from each other. However, the corresponding pixels in the region 011 and the region 012 need to have the same pixel value. For example, the pixel (2,2) in the region 011 and the pixel (5,6) in the region 012 need to have the same pixel value.

Step 202. In a case that the displacement data indicates that a displacement between the target object in the first video frame and the target object in the second video frame of the target video is greater than or equal to the preset value, the electronic device decodes the video frame data to obtain the first video frame and the second video frame, and inserts a third video frame according to a preset rule.

In the embodiments of this application, when the electronic device as shown in FIG. 1 is an executing body, the foregoing step 202 may be implemented through the following (1) to (4).

(1) The CPU determines, based on the displacement data, that the displacement between the target object in the first video frame and the target object in the second video frame is greater than or equal to the preset value.
(2) The CPU decodes the video frame data to obtain the first video frame and the second video frame.
(3) The CPU sends the first video frame, the second video frame, and the displacement between the target object in the first video frame and the target object in the second video frame to a discrete graphics chip.
(4) The discrete graphics chip obtains, based on the first video frame, the second video frame, and the displacement between the target object in the first video frame and the target object in the second video frame, the third video frame.

Illustratively, FIG. 3 is still used as an example. It is assumed that the preset value is a displacement of 3 pixels. Since the target object has moved a distance of 3 pixels on a horizontal axis and a distance of 4 pixels on a longitudinal axis, the motion vector of the target object is a distance of 5 pixels. Therefore, the CPU can determine that the displacement between the target object in the first video frame and the target object in the second video frame is greater than the preset value, and it can be considered that the target object undergoes a large displacement. If the displacement between the target object in the first video frame and the target object in the second video frame is less than a distance of 3 pixels, it is considered that the target object undergoes no displacement.

It can be understood that when the displacement between the target object in the first video frame and the target object in the second video frame is greater than the preset value, since the CPU needs to decode only the first video frame and the second video frame and does not need to decode video frames in which the target object has a small displacement, the CPU is temporarily released from a video processing task, such that the CPU can process other tasks such as calls and clock alarms. In addition, after the discrete graphics chip has received the first video frame, the second video frame, and the displacement between the target object in the first video frame and the target object in the second video frame sent by the CPU, the discrete graphics chip can perform frame insertion to obtain a third video frame, so as to compensate for loss caused by not decoding the video frames in which the target object has a small displacement, thereby ensuring the playback quality of the video.

It should be noted that an implementation manner in which the discrete graphics chip obtains the third video frame may refer to two video frame insertion manners provided in the following embodiments. Details are not described herein.

Step 203. The electronic device plays the first video frame, the second video frame, and the third video frame.

Optionally, there may be one first video frame and one second video frame, and there may be one or more third video frames.

Optionally, the first video frame and the second video frame may be adjacent video frames or non-adjacent video frames. In some embodiments, if the first video frame and the second video frame are adjacent video frames, the electronic device can insert a video frame after the first video frame and the second video frame to replace a video frame after the second video frame. If the first video frame and the second video frame are non-adjacent video frames, for example, a fourth video frame is also present between the first video frame and the second video frame, a video frame is inserted between the first video frame and the second video frame to replace the fourth video frame. It should be noted that when different frame insertion manners are used, the video frames are played in different orders. Reference may be made to the description in the following embodiment. Details are not described herein.

The embodiments of this application provide a video playback method. When a displacement between a target object in a first video frame and the target object in a second video frame of a target video is large, only the first video frame and the second video frame need to be decoded, and video frames in which the target object has a small displacement do not need to be decoded. Therefore, a CPU can be temporarily released from a video processing task, which reduces power consumption of the CPU and improves system performance of a device. In addition, inserting a third video frame can compensate for loss caused by not decoding the video frames in which the target object has a small displacement, thereby ensuring the playback quality of the video.

Figure 4:
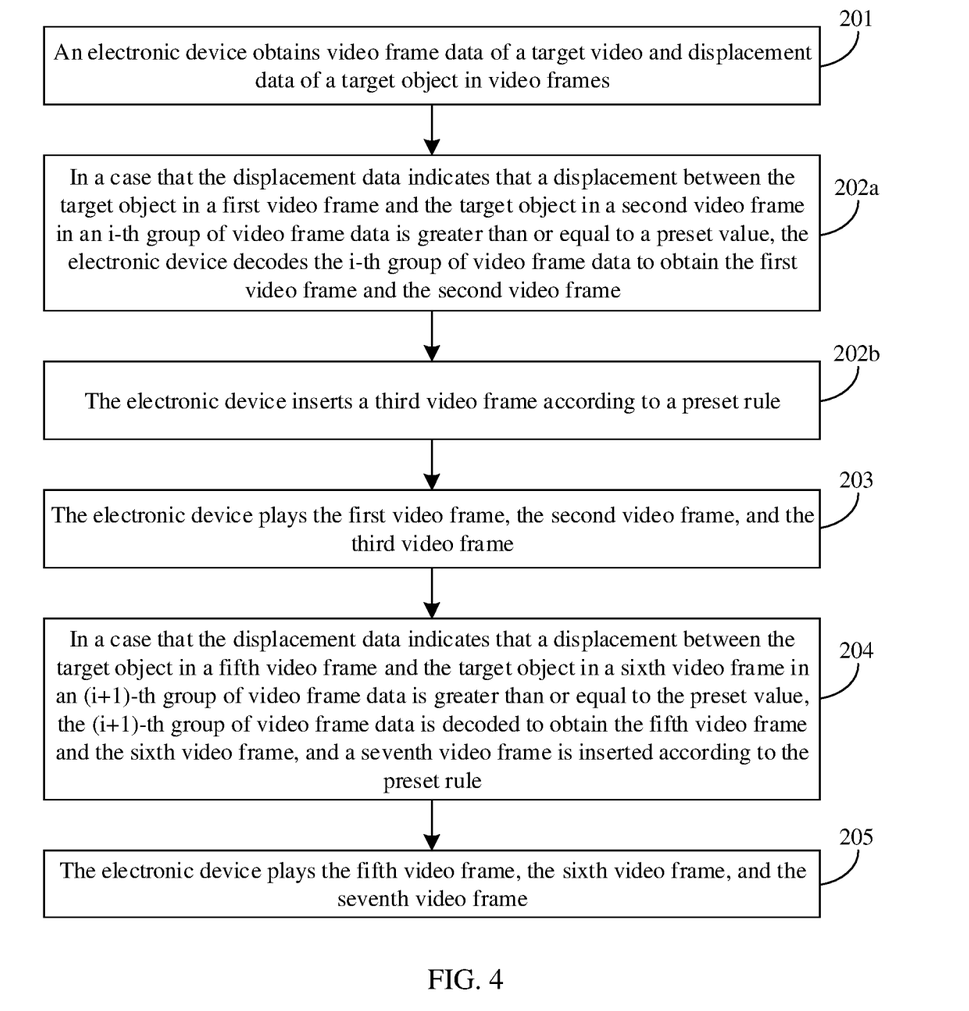
FIG. 4 is a second flowchart of a video playback method according to embodiments of this application.

Optionally, the target video may include M groups of video frame data. Each group of video frame data is data of N video frames. In some embodiments, each group of video frame data is data obtained after the N video frames are compressed. M is a positive integer, and N is an integer greater than or equal to 2. With reference to FIG. 2, as shown in FIG. 4, the foregoing step 202 may be implemented through the following step 202a and step 202b; and the following step 204 and step 205 may be implemented after the foregoing step 203.

Step 202a. In a case that the displacement data indicates that a displacement between the target object in a first video frame and the target object in a second video frame in an i-th group of video frame data is greater than or equal to a preset value, the electronic device decodes the i-th group of video frame data to obtain the first video frame and the second video frame.

In the embodiments of this application, i is a positive integer less than or equal to M, and i sequentially takes a value of 1, 2, . . . , and M.

Step 202b. The electronic device inserts a third video frame according to a preset rule.

Step 204. In a case that the displacement data indicates that a displacement between the target object in a fifth video frame and the target object in a sixth video frame in an (i+1)-th group of video frame data is greater than or equal to the preset value, the (i+1)-th group of video frame data is decoded to obtain the fifth video frame and the sixth video frame, and a seventh video frame is inserted according to the preset rule.

Step 205. The electronic device plays the fifth video frame, the sixth video frame, and the seventh video frame.

The implementation manners of step 204 and step 205 may refer to step 202 and step 203. Details are not described herein.

The following uses an example in which the target video includes 10 groups of video frame data and each group of video frame data is data obtained after 5 video frames are compressed, for illustrative description of the video playback method provided in this application.

When a user wants to watch the target video, data of 5 frames in a first group of video frame data is stored in a video buffer region, and the CPU detects the data of the 5 frames. If a detection result shows that displacements of the target object are less than the preset value in data of a second frame, data of a third frame, and data of a fourth frame with respect to data of a first frame in the first group of video frame data and that a displacement of the target object in data of a fifth frame with respect to the data of the first frame is greater than or equal to the preset value, the CPU needs to decode only the data of the first frame and the data of the fifth frame to obtain the first video frame and the fifth video frame, and sends the first video frame, the fifth video frame, and the displacement between the target object in the first video frame and the target object in the fifth video frame to a discrete graphics chip. Subsequently, the discrete graphics chip can perform frame insertion based on the first video frame, the fifth video frame, and the displacement between the target object in the first video frame and the target object in the fifth video frame according to a specific algorithm and displacement ratio, so as to insert a second video frame, a third video frame, and a fourth video frame between the first video frame and the fifth video frame. In this way, the first video frame, the second video frame, the third video frame, the fourth video frame, and the fifth video frame can be sequentially displayed on a display.

After the fifth video frame in the first group of video frame data has been played on the display, the CPU may be notified that video frame insertion and playback tasks have been completed. The CPU can continue to process data of 5 frames in a second group of video frame data stored in the video buffer region. For example, if the CPU has detected that a displacement of the target object in data of a second frame with respect to data of a first frame in the second group of video frame data is greater than or equal to the preset value, the CPU does not need to detect or decode data of a third frame, data of a fourth frame, and data of a fifth frame, and needs to decode only data of the first frame and data of the second frame to obtain the first video frame and the second video frame and sends the first video frame, the second video frame, and the displacement between the target object in the first video frame and the target object in the second video frame to the discrete graphics chip. Subsequently, the discrete graphics chip can perform frame insertion based on the first video, the second video frame, and the displacement between the target object in the first video frame and the target object in the second video frame according to a specific algorithm and displacement ratio, so as to insert a third video frame, a fourth video frame, and a fifth video frame after the first video frame and the second video frame. In this way, the first video frame, the second video frame, the third video frame, the fourth video frame, and the fifth video frame can be sequentially displayed on the display.

After the fifth video frame in the second group of video frame data has been played on the display, the CPU may be notified that video frame insertion and playback tasks have been completed. In this way, the CPU can continue to process the remaining eight groups of video frame data in the foregoing manner until all frames have been played.

The video playback method according to the embodiments of this application is used in scenarios involving video grouping processing. The target video is divided into multiple groups of video frame data, so that the CPU can sequentially decompress the video frames in batches or perform other operations. In addition, after each group of video frame data has been processed, the CPU is temporarily released from a video processing task to process other routine tasks such as calls, messages, emails, and Bluetooth, thereby improving performance of the device.

Optionally, the embodiments of this application provide two video frame insertion manners.

First Video Frame Insertion Manner

The first video frame and the second video frame are adjacent video frames. In this case, a manner of inserting a video frame after the first video frame and the second video frame is used. The foregoing step 202 may be implemented through the following step A1 and step A2. Correspondingly, the foregoing step 203 may be implemented through the following step A3.

Step A1. In a case that the displacement data indicates that the displacement between the target object in the first video frame and the target object in the second video frame of the target video is greater than or equal to the preset value, the electronic device decodes the video frame data to obtain the first video frame and the second video frame.

Step A2. The electronic device inserts, based on the displacement between the target object in the first video frame and the target object in the second video frame, the third video frame after the second video frame.

Optionally, the displacement between the target object in the third video frame and the target object in the second video frame is greater than or equal to the preset value. It can be understood that the displacement between the target object in the first video frame and the target object in the second video frame of the target video is greater than or equal to the preset value. Therefore, the target object in a video frame after the second video frame is likely to have a large displacement, and setting the displacement between the target object in the third video frame and the target object in the second video frame to be greater than or equal to the preset value allows for more accurate prediction for a motion trend of the target object in the video frame after the second video frame.

Step A3. The electronic device sequentially plays the first video frame, the second video frame, and the third video frame.

In an optional implementation, after having obtained the first video frame and the second video frame by decoding the video frame data, the electronic device immediately plays the first video frame and the second video frame. While playing the first video frame and the second video frame, the electronic device inserts, based on the displacement between the target object in the first video frame and the target object in the second video frame, the third video frame after the second video frame, so as to play the third video frame after playing the second video frame.

In another optional implementation, after having obtained the first video frame and the second video frame by decoding the video frame data, the electronic device inserts, based on the displacement between the target object in the first video frame and the target object in the second video frame, the third video frame after the second video frame. Subsequently, the first video frame, the second video frame, and the third video frame are played.

Figure 5:
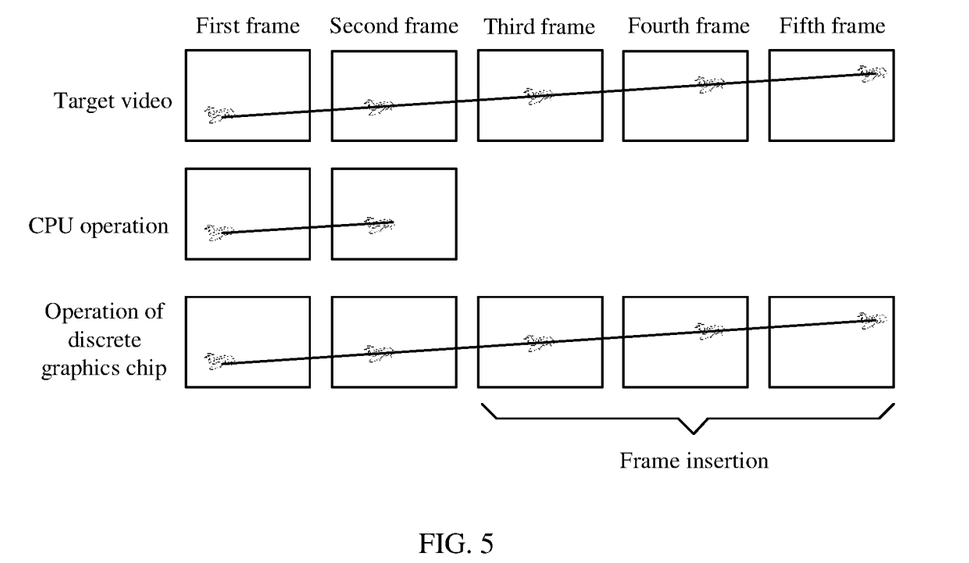
FIG. 5 is a first schematic diagram of a frame insertion operation according to embodiments of this application.

Illustratively, that the target video includes 10 groups of video frame data and each group of video frame data is data obtained after 5 video frames are compressed is still used as an example. It is assumed that the preset value is a displacement of 3 pixels. As shown in FIG. 5, the CPU can detect data of 5 frames in a first group of video frame data stored in a video buffer region. If the CPU has detected that a displacement of the target object in data of a second frame with respect to data of a first frame in the first group of video frame data is a distance of 5 pixels, the CPU does not need to detect or decode data of other frames and needs to decode only data of the first frame and data of the second frame, so as to obtain the first video frame and the second video frame; and then the CPU sends the first video frame, the second video frame, and the displacement between the target object in the first video frame and the target object in the second video frame to a discrete graphics chip, so as to notify the discrete graphics chip to perform video playback and frame insertion. In this way, the CPU can be released from a video playback task to process other tasks such as calls, messages, emails, and Bluetooth.

After having received the first video frame and the second video frame, the discrete graphics chip can directly display the first video frame and the second video frame. In addition, the discrete graphics chip can perform frame insertion based on the first video, the second video frame, and the displacement between the target object in the first video frame and the target object in the second video frame according to a specific algorithm and displacement ratio. For example, the discrete graphics chip continues to move the target object in the second video frame by a distance of 5 pixels to obtain a third video frame, subsequently continues to move the target object in the third video frame by a distance of 5 pixels to obtain a fourth video frame, and then continues to move the target object in the fourth video frame by 5 pixels to obtain a fifth video frame. In this way, after the second video frame has been played, the third video frame, the fourth video frame, and the fifth video frame can continue to be played on the display.

The video playback method according to the embodiments of this application is used in a scenario in which a large displacement of the target object is detected in the first two video frames. Based on the displacement of the target object in the two video frames, a displacement trend of the target object in a video frame after the two frames can be predicted. Therefore, a video frame can be inserted after an adjacent video frame, so that the CPU does not need to decode the video frame after the two video frames, and the CPU is temporarily released from a video processing task to process other routine tasks such as calls, messages, emails, and Bluetooth.

Second Video Frame Insertion Manner

The first video frame and the second video frame are non-adjacent video frames. In this case, a manner of inserting a video frame between the first video frame and the second video frame is used. The foregoing step 202 may be implemented through the following step B1 and step B2. Correspondingly, the foregoing step 203 may be implemented through the following step B3.

Step B1. In a case that the displacement data indicates that the displacement between the target object in the first video frame and the target object in the second video frame of the target video is greater than or equal to the preset value and that the displacement between the target object in the first video frame and the target object in the fourth video frame is less than the preset value, the electronic device decodes the video frame data to obtain the first video frame and the second video frame.

Step B2. The electronic device inserts, based on the displacement between the target object in the first video frame and the target object in the second video frame, a third video frame between the first video frame and the second video frame.

Optionally, the displacement between the target object in the first video frame and the target object in the third video frame is less than the preset value. It can be understood that the displacement between the target object in the first video frame and the target object in the fourth video frame is less than the preset value. Therefore, the third video frame serves as an alternative frame of the fourth video frame. If the displacement between the target object in the third video frame and the target object in the first video frame is less than the preset value, a position vector of the target object in the fourth video frame is more accurate.

Step B3. The electronic device sequentially plays the first video frame, the third video frame, and the second video frame.

In an optional implementation, after having obtained the first video frame and the second video frame by decoding the video frame data, the electronic device immediately plays the first video frame. While playing the first video frame, the electronic device inserts, based on the displacement between the target object in the first video frame and the target object in the second video frame, the third video frame between the first video frame and the second video frame, so as to play the third video frame after playing the first video frame. After that, the second video frame is played.

In another optional implementation, after having obtained the first video frame and the second video frame by decoding the video frame data, the electronic device inserts, based on the displacement between the target object in the first video frame and the target object in the second video frame, the third video frame between the first video frame and the second video frame, and then sequentially plays the first video frame, the third video frame, and the second video frame.

Figure 6:
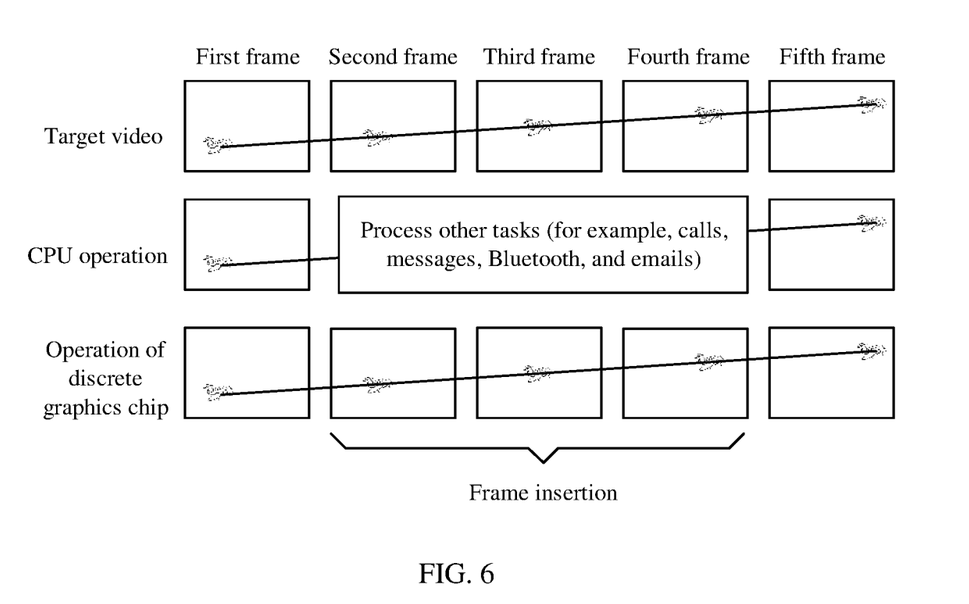
FIG. 6 is a second schematic diagram of a frame insertion operation according to embodiments of this application.

Illustratively, that the target video includes 10 groups of video frame data and each group of video frame data is data obtained after 5 video frames are compressed is still used as an example. It is assumed that the preset value is a displacement of 4 pixels. As shown in FIG. 6, the CPU can detect data of 5 frames in a first group of video frame data stored in a video buffer region. If the CPU has detected that displacements of the target object are all less than a distance of 4 pixels in data of a second frame, data of a third frame, and data of a fourth frame with respect to data of a first frame in the first group of video frame data and that a displacement of the target object in the data of the fifth frame with respect to the data of a first frame is a distance of 4 pixels, the CPU does not need to decode the data of the second frame, the data of the third frame and the data of the fourth frame, and the CPU needs to decode only the data of the first frame and the data of the fifth frame to obtain the first video frame and the fifth video frame, and send the first video frame, the fifth video frame, and the displacement between the target object in the first video frame and the target object in the fifth video frame to the discrete graphics chip, so as to notify the discrete graphics chip to perform video playback and frame insertion. In this way, the CPU can be released from a video playback task to process other tasks such as calls, messages, emails, and Bluetooth.

After having received the first video frame and the fifth video frame, the discrete graphics chip can directly display the first video frame. In addition, the discrete graphics chip can perform frame insertion based on the first video frame, the fifth video frame, and the displacement between the target object in the first video frame and the target object in the fifth video frame according to a specific algorithm and displacement ratio. For example, on the basis of the first video frame, the discrete graphics chip continues to move the target object in the first video frame by a distance of 1 pixel to obtain a second video frame, subsequently continues to move the target object in the second video frame by a distance of 1 pixel to obtain a third video frame, and then continues to move the target object in the third video frame by a distance of 1 pixel to obtain a fourth video frame. In this way, after the first video frame has been played, the second video frame, the third video frame, the fourth video frame, and the fifth video frame can continue to be sequentially played on the display.

The video playback method according to the embodiments of this application is used in a scenario in which a large displacement of the target object is detected in video frames with an interval therebetween. A displacement trend of the target object in the two frames can be predicted based on the displacement of the target object in the two video frames. Therefore, video frames can be inserted between the two video frames, such that the CPU does not need to decode the video frame between the two video frames, and the CPU is temporarily released from a video processing task to process other routine tasks such as calls, messages, emails, and Bluetooth.

It should be noted that the video playback method according to the embodiments of this application may be executed by a video playback apparatus or a control module configured to implement the video playback method in the video playback apparatus. In the embodiments of this application, an example in which the video playback apparatus executes the video playback method is used for describing the video playback apparatus according to the embodiments of this application.

Figure 7:
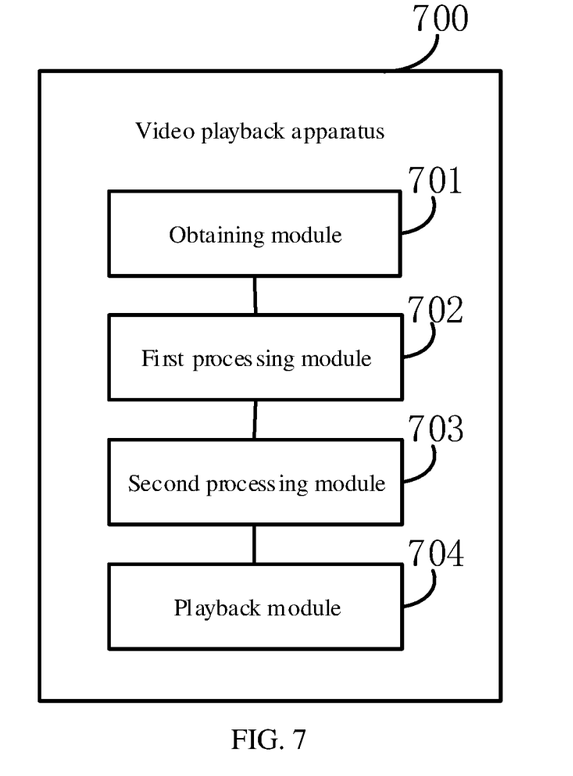
FIG. 7 is a schematic structural diagram of a video playback apparatus according to embodiments of this application.

As shown in FIG. 7, the embodiments of this application provide a video playback apparatus 700. The video playback apparatus 700 includes an obtaining module 701, a first processing module 702, a second processing module 703, and a playback module 704.

The obtaining module 701 may be configured to obtain video frame data of a target video and displacement data of a target object in video frames. The first processing module 702 may be configured to, in a case that the displacement data indicates that a displacement between the target object in a first video frame and the target object in a second video frame of the target video is greater than or equal to a preset value, decode the video frame data to obtain the first video frame and the second video frame. The second processing module 703 may be configured to insert a third video frame according to a preset rule. The playback module 704 may be configured to play the first video frame, the second video frame, and the third video frame.

Optionally, the first video frame and the second video frame are adjacent video frames. The second processing module 703 may be configured to insert, based on the displacement between the target object in the first video frame and the target object in the second video frame, the third video frame after the second video frame. The playback module 704 may be configured to sequentially play the first video frame, the second video frame, and the third video frame.

Optionally, a fourth video frame is also present between the first video frame and the second video frame. The first processing module 702 may be configured to, in a case that the displacement data indicates that the displacement between the target object in the first video frame and the target object in the second video frame is greater than or equal to the preset value and that the displacement between the target object in the first video frame and the target object in the fourth video frame is less than the preset value, decode the video frame data to obtain the first video frame and the second video frame. The second processing module 703 may be configured to insert, based on the displacement between the target object in the first video frame and the target object in the second video frame, a third video frame between the first video frame and the second video frame. The playback module 704 may be configured to sequentially play the first video frame, the third video frame, and the second video frame.

Optionally, the first processing module 702 may be configured to determine, based on the displacement data, that the displacement between the target object in the first video frame and the target object in the second video frame is greater than or equal to the preset value, decode the video frame data to obtain the first video frame and the second video frame, and send the first video frame, the second video frame, and the displacement between the target object in the first video frame and the target object in the second video frame to the second processing module 703. The second processing module 703 may be configured to obtain, based on the first video frame, the second video frame, and the displacement between the target object in the first video frame and the target object in the second video frame, the third video frame.

Optionally, the target video includes M groups of video frame data. Each group of video frame data is data of N video frames, where M is a positive integer, and N is an integer greater than or equal to 2. The first processing module 702 may be configured to, in a case that the displacement data indicates that a displacement between the target object in a first video frame and the target object in a second video frame in an i-th group of video frame data is greater than or equal to a preset value, decode the i-th group of video frame data to obtain the first video frame and the second video frame, where i is a positive integer less than or equal to M.

The first processing module 702 may be further configured to, after playing the first video frame, the second video frame and the third video frame and in a case that the displacement data indicates that a displacement between the target object in a fifth video frame and the target object in a sixth video frame in an (i+1)-th group of video frame data is greater than or equal to the preset value, decode the (i+1)-th group of video frame data to obtain the fifth video frame and the sixth video frame.

The second processing module 703 may be further configured to insert a seventh video frame according to a preset rule.

The playback module 704 may be further configured to play the fifth video frame, the sixth video frame, and the seventh video frame.

The embodiments of this application provide a video playback apparatus. When a target object in a first video frame and a second video frame of a target video has a large displacement, the apparatus needs to decode only the first video frame and the second video frame and does not need to decode video frames in which the target object has a small displacement. Therefore, a CPU can be temporarily released from a video processing task, which reduces power consumption of the CPU and improves system performance of a device. In addition, inserting a third video frame can compensate for loss caused by not decoding the video frames in which the target object has a small displacement, thereby ensuring the playback quality of the video.

The video playback apparatus in the embodiments of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The video playback apparatus in the embodiments of this application may be an apparatus having an operating system. The operating system may be an android operating system, an iOS operating system, or other possible operating systems. This is not specifically limited in the embodiments of this application.

The video playback apparatus according to the embodiments of this application can implement the processes implemented in the method embodiments of FIG. 1 to FIG. 6. To avoid repetition, details are not described herein again.

Figure 8:
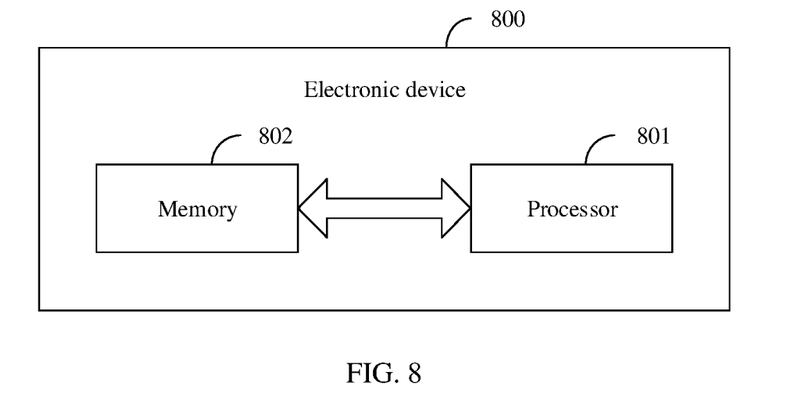
FIG. 8 is a first schematic diagram of hardware of an electronic device according to embodiments of this application.

Optionally, as shown in FIG. 8, the embodiments of this application further provide an electronic device 800 including a processor 801, a memory 802, and a program or instructions stored in the memory 802 and executable on the processor 801. When the program or instructions are executed by the processor 801, the processes of the foregoing video playback method embodiments are implemented, with the same technical effects achieved. To avoid repetition, details are not described herein again.

It should be noted that the electronic device in the embodiments of this application includes the foregoing mobile electronic device and non-mobile electronic device.

Figure 9:
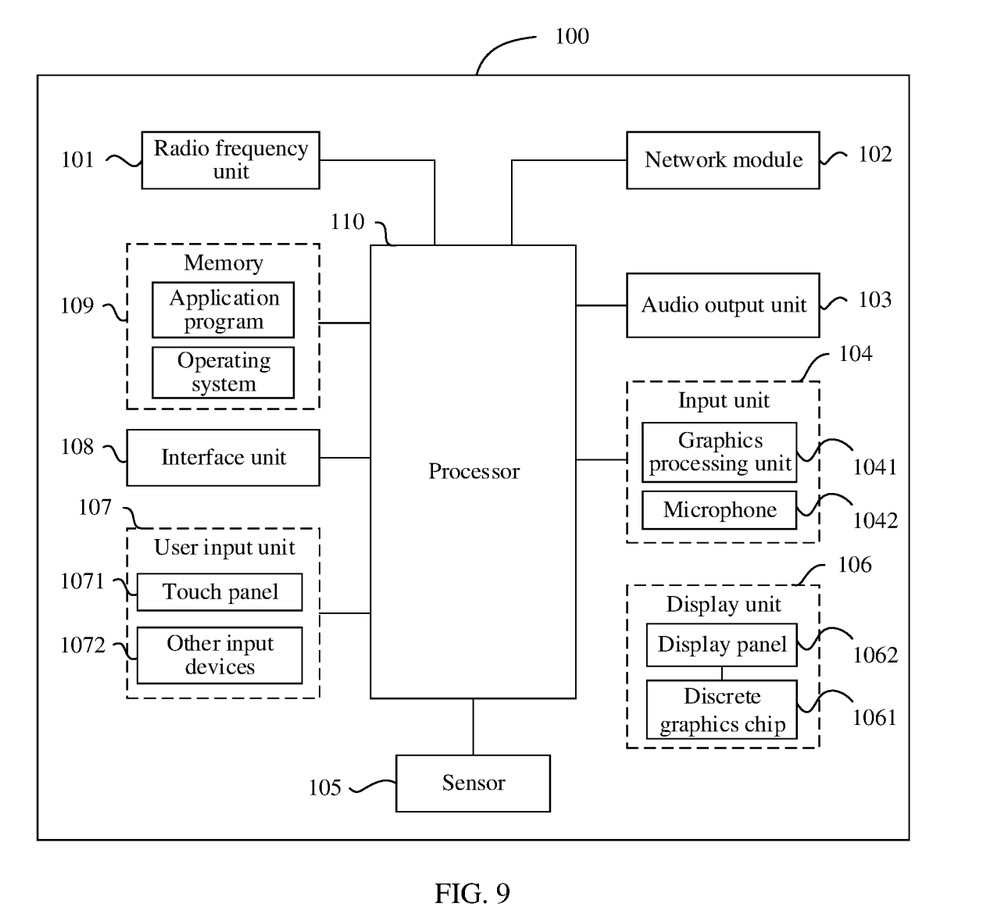
FIG. 9 is a second schematic diagram of hardware of an electronic device according to embodiments of this application.

FIG. 9 is a schematic diagram of a hardware structure of an electronic device according to embodiments of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It can be understood by persons skilled in the art that the electronic device 100 may further include a power supply (for example, a battery) supplying power to the components. The power supply may be logically connected to the processor 110 via a power management system, so that functions such as charge management, discharge management, and power consumption management are implemented via the power management system. The structure of the electronic device shown in FIG. 9 does not constitute a limitation on the electronic device. The electronic device may include more or fewer components than shown in the drawing, or combine some of the components, or arrange the components differently. Details are not described herein again.

The first processor 110 may be configured to obtain video frame data of a target video and displacement data of a target object in video frame, and decode the video frame data to obtain a first video frame and a second video frame in a case that the displacement data indicates that a displacement between the target object in the first video frame and the target object in the second video frame of the target video is greater than or equal to a preset value.

A discrete graphics chip 1061 may be configured to insert a third video frame according to a preset rule.

A display panel 1062 may be configured to play the first video frame, the second video frame, and the third video frame.

Optionally, the first video frame and the second video frame are adjacent video frames. The discrete graphics chip 1061 may be configured to insert, based on the displacement between the target object in the first video frame and the target object in the second video frame, the third video frame after the second video frame. The display panel 1062 may be configured to sequentially play the first video frame, the second video frame, and the third video frame.

Optionally, a fourth video frame is also present between the first video frame and the second video frame. The processor 110 may be configured to, in a case that the displacement data indicates that the displacement between the target object in the first video frame and the target object in the second video frame is greater than or equal to the preset value and that the displacement between the target object in the first video frame and the target object in the fourth video frame is less than the preset value, decode the video frame data to obtain the first video frame and the second video frame. The discrete graphics chip 1061 may be configured to insert, based on the displacement between the target object in the first video frame and the target object in the second video frame, the third video frame between the first video frame and the second video frame. The display panel 1062 may be configured to sequentially play the first video frame, the third video frame, and the second video frame.

Optionally, the processor 110 may be configured to determine, based on the displacement data, that the displacement between the target object in the first video frame and the target object in the second video frame is greater than or equal to the preset value, decode the video frame data to obtain the first video frame and the second video frame, and send the first video frame, the second video frame, and the displacement between the target object in the first video frame and the target object in the second video frame to the discrete graphics chip 1061. The discrete graphics chip 1061 may be configured to obtain, based on the first video frame, the second video frame, and the displacement between the target object in the first video frame and the target object in the second video frame, the third video frame.

Optionally, the target video includes M groups of video frame data. Each group of video frame data is data of N video frames, where M is a positive integer, and N is an integer greater than or equal to 2. The processor 110 may be configured to, in a case that the displacement data indicates that a displacement between the target object in a first video frame and the target object in a second video frame in an i-th group of video frame data is greater than or equal to the preset value, decode the i-th group of video frame data to obtain the first video frame and the second video frame, where i is a positive integer less than or equal to M.

The processor 110 may be further configured to, after playing the first video frame, the second video frame and the third video frame and in a case that the displacement data indicates that a displacement between the target object in a fifth video frame and the target object in a sixth video frame in an (i+1)-th group of video frame data is greater than or equal to the preset value, decode the (i+1)-th group of video frame data to obtain the fifth video frame and the sixth video frame.

The discrete graphics chip 1061 may be further configured to insert a seventh video frame according to a preset rule.

The display panel 1062 may be further configured to play the fifth video frame, the sixth video frame, and the seventh video frame.

The embodiments of this application provide an electronic device. When a target object in a first video frame and a second video frame of a target video has a large displacement, the device needs to decode only the first video frame and the second video frame and does not need to decode video frames in which the target object has a small displacement. Therefore, a CPU can be temporarily released from a video processing task, which reduces power consumption of the CPU and improves system performance of a device. In addition, inserting a third video frame can compensate for loss caused by not decoding the video frames in which the target object has a small displacement, thereby ensuring the playback quality of the video.

It should be understood that in the embodiments of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a discrete graphics chip 1061 and a display panel 1062. The display panel 1062 may be configured in a form of a liquid crystal display, an organic light-emitting diode display, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function button (for example, a volume control button or a power on/off button), a trackball, a mouse, and a joystick. Details are not described herein again. The memory 109 may be configured to store software programs and various data which include but are not limited to an application program and an operating system. The processor 110 may integrate an application processor and a modem processor. The application processor mainly processes the operating system, a user interface, an application program, and the like. The modem processor mainly processes wireless communication. It can be understood that the modem processor may alternatively be not integrated in the processor 110.

The embodiments of this application further provide a non-transitory readable storage medium. The non-transitory readable storage medium stores a program or instructions. When the program or instructions are executed by a processor, the processes of the foregoing video playback method embodiments are implemented, with the same technical effects achieved. To avoid repetition, details are not described herein again.

The processor is the processor in the electronic device in the foregoing embodiments. The non-transitory readable storage medium includes a non-transitory computer-readable storage medium such as a computer read-only memory (ROM), a random access memory (RAM), a magnetic disk, or an optical disc.

The embodiments of this application further provide a chip. The chip includes a processor and a communication interface. The communication interface is coupled to the processor. The processor is configured to run a program or instructions to implement the processes of the foregoing video playback method embodiments, with the same technical effects achieved. To avoid repetition, details are not described herein again.

It should be understood that the chip in the embodiments of this application may also be referred to as a system-level chip, a system chip, a chip system, a system on chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred example. Based on such an understanding, the technical solutions of this application essentially, or the part contributing to the prior art may be implemented in a form of a computer software product. The computer software product is stored in a non-transitory storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing implementations. These implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A video playback method, wherein the method comprises:

obtaining video frame data of a target video and displacement data of a target object in video frames;

in a case that the displacement data indicates that a displacement between the target object in a first video frame and the target object in a second video frame of the target video is greater than or equal to a preset value, decoding the video frame data to obtain the first video frame and the second video frame, and inserting a third video frame according to a preset rule; and playing the first video frame, the second video frame, and the third video frame.

2. The method according to claim 1, wherein the first video frame and the second video frame are adjacent video frames;
the inserting a third video frame according to a preset rule comprises:
inserting, based on the displacement between the target object in the first video frame and the target object in the second video frame, the third video frame after the second video frame; and
the playing the first video frame, the second video frame, and the third video frame comprises:
sequentially playing the first video frame, the second video frame, and the third video frame.

3. The method according to claim 1, wherein a fourth video frame is also present between the first video frame and the second video frame;
the step of, in a case that the displacement data indicates that a displacement between the target object in a first video frame and the target object in a second video frame of the target video is greater than or equal to a preset value, decoding the video frame data to obtain the first video frame and the second video frame, and inserting a third video frame according to a preset rule comprises:
in a case that the displacement data indicates that the displacement between the target object in the first video frame and the target object in the second video frame is greater than or equal to the preset value and that a displacement between the target object in the first video frame and the target object in the fourth video frame is less than the preset value, decoding the video frame data to obtain the first video frame and the second video frame, and inserting, based on the displacement between the target object in the first video frame and the target object in the second video frame, the third video frame between the first video frame and the second video frame; and
the playing the first video frame, the second video frame, and the third video frame comprises:
sequentially playing the first video frame, the third video frame, and the second video frame.

4. The method according to claim 1, wherein the step of, in a case that the displacement data indicates that a displacement between the target object in a first video frame and the target object in a second video frame of the target video is greater than or equal to a preset value, decoding the video frame data to obtain the first video frame and the second video frame, and inserting a third video frame according to a preset rule comprises:
determining, by a central processing unit based on the displacement data, that the displacement between the target object in the first video frame and the target object in the second video frame is greater than or equal to the preset value;
decoding, by the central processing unit, the video frame data to obtain the first video frame and the second video frame, and sending the first video frame, the second video frame, and the displacement between the target object in the first video frame and the target object in the second video frame to a discrete graphics chip; and
obtaining, by the discrete graphics chip based on the first video frame, the second video frame, and the displacement between the target object in the first video frame and the target object in the second video frame, the third video frame.

5. The method according to claim 1, wherein the target video comprises M groups of video frame data, each group of video frame data being data of N video frames, wherein M is a positive integer, and N is an integer greater than or equal to 2;
the step of, in a case that the displacement data indicates that a displacement between the target object in a first video frame and the target object in a second video frame of the target video is greater than or equal to a preset value, decoding the video frame data to obtain the first video frame and the second video frame comprises:
in a case that the displacement data indicates that a displacement between the target object in a first video frame and the target object in a second video frame in an i-th group of video frame data is greater than or equal to the preset value, decoding the i-th group of video frame data to obtain the first video frame and the second video frame, wherein i is a positive integer less than or equal to M; and
after the playing the first video frame, the second video frame, and the third video frame, the method further comprises:
in a case that the displacement data indicates that a displacement between the target object in a fifth video frame and the target object in a sixth video frame in an (i+1)-th group of video frame data is greater than or equal to the preset value, decoding the (i+1)-th group of video frame data to obtain the fifth video frame and the sixth video frame, and inserting a seventh video frame according to the preset rule; and
playing the fifth video frame, the sixth video frame, and the seventh video frame.

6. A chip, wherein the chip comprises a processor and a communication interface, the communication interface is coupled to the processor, and the processor is adapted to run a program or instructions to implement steps of the video playback method according to claim 1.

7. An electronic device, comprising a processor, a memory, and a program or instructions stored in the memory and executable on the processor, wherein the program or instructions, when executed by the processor, causes the electronic device to perform:
obtaining video frame data of a target video and displacement data of a target object in video frames;
in a case that the displacement data indicates that a displacement between the target object in a first video frame and the target object in a second video frame of the target video is greater than or equal to a preset value, decoding the video frame data to obtain the first video frame and the second video frame, and inserting a third video frame according to a preset rule; and
playing the first video frame, the second video frame, and the third video frame.

8. The electronic device according to claim 7, wherein the first video frame and the second video frame are adjacent video frames;
the program or instructions, when executed by the processor, causes the electronic device to perform:
inserting, based on the displacement between the target object in the first video frame and the target object in the second video frame, the third video frame after the second video frame; and
sequentially playing the first video frame, the second video frame, and the third video frame.

9. The electronic device according to claim 7, wherein a fourth video frame is also present between the first video frame and the second video frame;

the program or instructions, when executed by the processor, causes the electronic device to perform:

in a case that the displacement data indicates that the displacement between the target object in the first video frame and the target object in the second video frame is greater than or equal to the preset value and that a displacement between the target object in the first video frame and the target object in the fourth video frame is less than the preset value, decoding the video frame data to obtain the first video frame and the second video frame, and inserting, based on the displacement between the target object in the first video frame and the target object in the second video frame, the third video frame between the first video frame and the second video frame; and sequentially playing the first video frame, the third video frame, and the second video frame.

10. The electronic device according to claim 7, wherein the program or instructions, when executed by the processor, causes the electronic device to perform:

determining that the displacement between the target object in the first video frame and the target object in the second video frame is greater than or equal to the preset value;

decoding the video frame data to obtain the first video frame and the second video frame, and sending the first video frame, the second video frame, and the displacement between the target object in the first video frame and the target object in the second video frame to a discrete graphics chip; and obtaining, based on the first video frame, the second video frame, and the displacement between the target object in the first video frame and the target object in the second video frame, the third video frame.

11. The electronic device according to claim 7, wherein the target video comprises M groups of video frame data, each group of video frame data being data of N video frames, wherein M is a positive integer, and N is an integer greater than or equal to 2;

the program or instructions, when executed by the processor, causes the electronic device to perform:

in a case that the displacement data indicates that a displacement between the target object in a first video frame and the target object in a second video frame in an i-th group of video frame data is greater than or equal to the preset value, decoding the i-th group of video frame data to obtain the first video frame and the second video frame, wherein i is a positive integer less than or equal to M; and the program or instructions, when executed by the processor, causes the electronic device to further perform:

in a case that the displacement data indicates that a displacement between the target object in a fifth video frame and the target object in a sixth video frame in an (i+1)-th group of video frame data is greater than or equal to the preset value, decoding the (i+1)-th group of video frame data to obtain the fifth video frame and the sixth video frame, and inserting a seventh video frame according to the preset rule; and playing the fifth video frame, the sixth video frame, and the seventh video frame.

12. A non-transitory readable storage medium, wherein the non-transitory readable storage medium stores a program or instructions, and the program or instructions, when executed by a processor of an electronic device, causes the electronic device to perform:

obtaining video frame data of a target video and displacement data of a target object in video frames;

in a case that the displacement data indicates that a displacement between the target object in a first video frame and the target object in a second video frame of the target video is greater than or equal to a preset value, decoding the video frame data to obtain the first video frame and the second video frame, and inserting a third video frame according to a preset rule; and playing the first video frame, the second video frame, and the third video frame.

13. The non-transitory readable storage medium according to claim 12, wherein the first video frame and the second video frame are adjacent video frames;

the program or instructions, when executed by the processor, causes the electronic device to perform:

inserting, based on the displacement between the target object in the first video frame and the target object in the second video frame, the third video frame after the second video frame; and sequentially playing the first video frame, the second video frame, and the third video frame.

14. The non-transitory readable storage medium according to claim 12, wherein a fourth video frame is also present between the first video frame and the second video frame;

the program or instructions, when executed by the processor, causes the electronic device to perform:

in a case that the displacement data indicates that the displacement between the target object in the first video frame and the target object in the second video frame is greater than or equal to the preset value and that a displacement between the target object in the first video frame and the target object in the fourth video frame is less than the preset value, decoding the video frame data to obtain the first video frame and the second video frame, and inserting, based on the displacement between the target object in the first video frame and the target object in the second video frame, the third video frame between the first video frame and the second video frame; and sequentially playing the first video frame, the third video frame, and the second video frame.

15. The non-transitory readable storage medium according to claim 12, wherein the program or instructions, when executed by the processor, causes the electronic device to perform:

determining that the displacement between the target object in the first video frame and the target object in the second video frame is greater than or equal to the preset value;

decoding the video frame data to obtain the first video frame and the second video frame, and sending the first video frame, the second video frame, and the displacement between the target object in the first video frame and the target object in the second video frame to a discrete graphics chip; and obtaining, based on the first video frame, the second video frame, and the displacement between the target object in the first video frame and the target object in the second video frame, the third video frame.

16. The non-transitory readable storage medium according to claim 12, wherein the target video comprises M groups of video frame data, each group of video frame data being data of N video frames, wherein M is a positive integer, and N is an integer greater than or equal to 2;

the program or instructions, when executed by the processor, causes the electronic device to perform:

in a case that the displacement data indicates that a displacement between the target object in a first video frame and the target object in a second video frame in an i-th group of video frame data is greater than or equal to the preset value, decoding the i-th group of video frame data to obtain the first video frame and the second video frame, wherein i is a positive integer less than or equal to M; and the program or instructions, when executed by the processor, causes the electronic device to further perform:

in a case that the displacement data indicates that a displacement between the target object in a fifth video frame and the target object in a sixth video frame in an (i+1)-th group of video frame data is greater than or equal to the preset value, decoding the (i+1)-th group of video frame data to obtain the fifth video frame and the sixth video frame, and inserting a seventh video frame according to the preset rule; and playing the fifth video frame, the sixth video frame, and the seventh video frame.

* * * * *